No. 895,308. PATENTED AUG. 4, 1908.
A. H. F. SCHAAR.
CONSTANT SPEED MECHANISM.
APPLICATION FILED JULY 13, 1906.

3 SHEETS—SHEET 2.

WITNESSES:

INVENTOR.
Adolph H. F. Schaar
By Spear & Seely
ATTORNEYS.

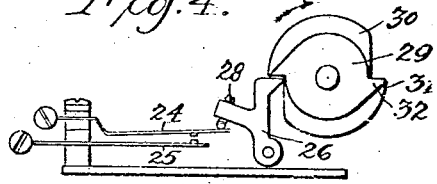
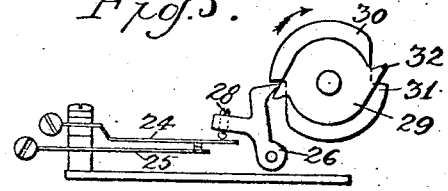
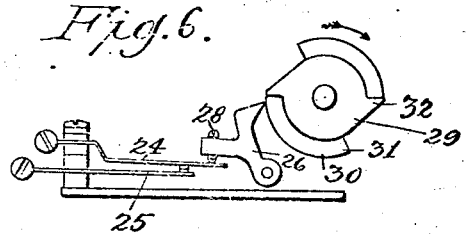
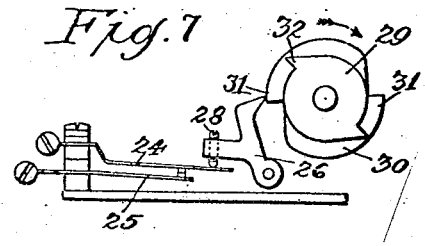
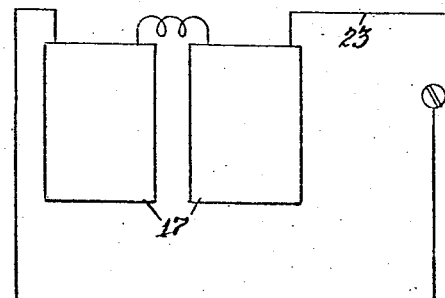
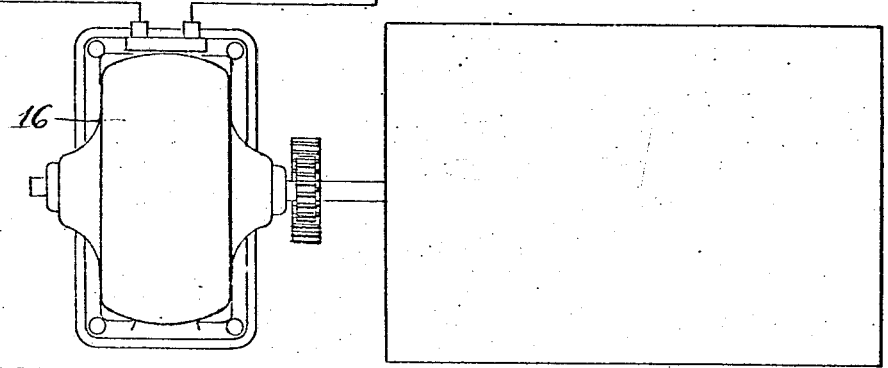

UNITED STATES PATENT OFFICE.

ADOLPH H. F. SCHAAR, OF SAN FRANCISCO, CALIFORNIA, ASSIGNOR TO UNITED STATES WIRELESS PRINTING TELEGRAPH CO., OF SAN FRANCISCO, CALIFORNIA, A CORPORATION OF WASHINGTON.

CONSTANT-SPEED MECHANISM.

No. 895,308.      Specification of Letters Patent.      Patented Aug. 4, 1908.

Application filed July 13, 1906. Serial No. 326,064.

*To all whom it may concern:*

Be it known that I, ADOLPH H. F. SCHAAR, citizen of the United States, residing at San Francisco, in the county of San Francisco and State of California, have invented certain new and useful Improvements in Constant-Speed Mechanism, of which the following is a specification.

My invention relates to constant speed mechanism, and more particularly to that class of such devices in which two motors are used, one to act upon and through the other.

In the use of certain kinds of machinery where it is desirable to have a uniform speed neither electricity from a local source, as a battery, nor a spring can be satisfactorily used alone, owing to the extreme variation in the power given off for a length of time sufficiently long to be of the desired utility. But I have discovered that by combining them a substantially uniform speed may be maintained for any desired length of time. I accomplish this by using a spring, preferably in the form of a plurality of coils connected together in tandem, and using the power from an electrical battery for rewinding the spring at stated intervals. The spring is provided with means for automatically cutting in and out the battery intermittently, to cause it to exert its force only when desired to actuate the mechanism for rewinding the spring.

Figure 1:
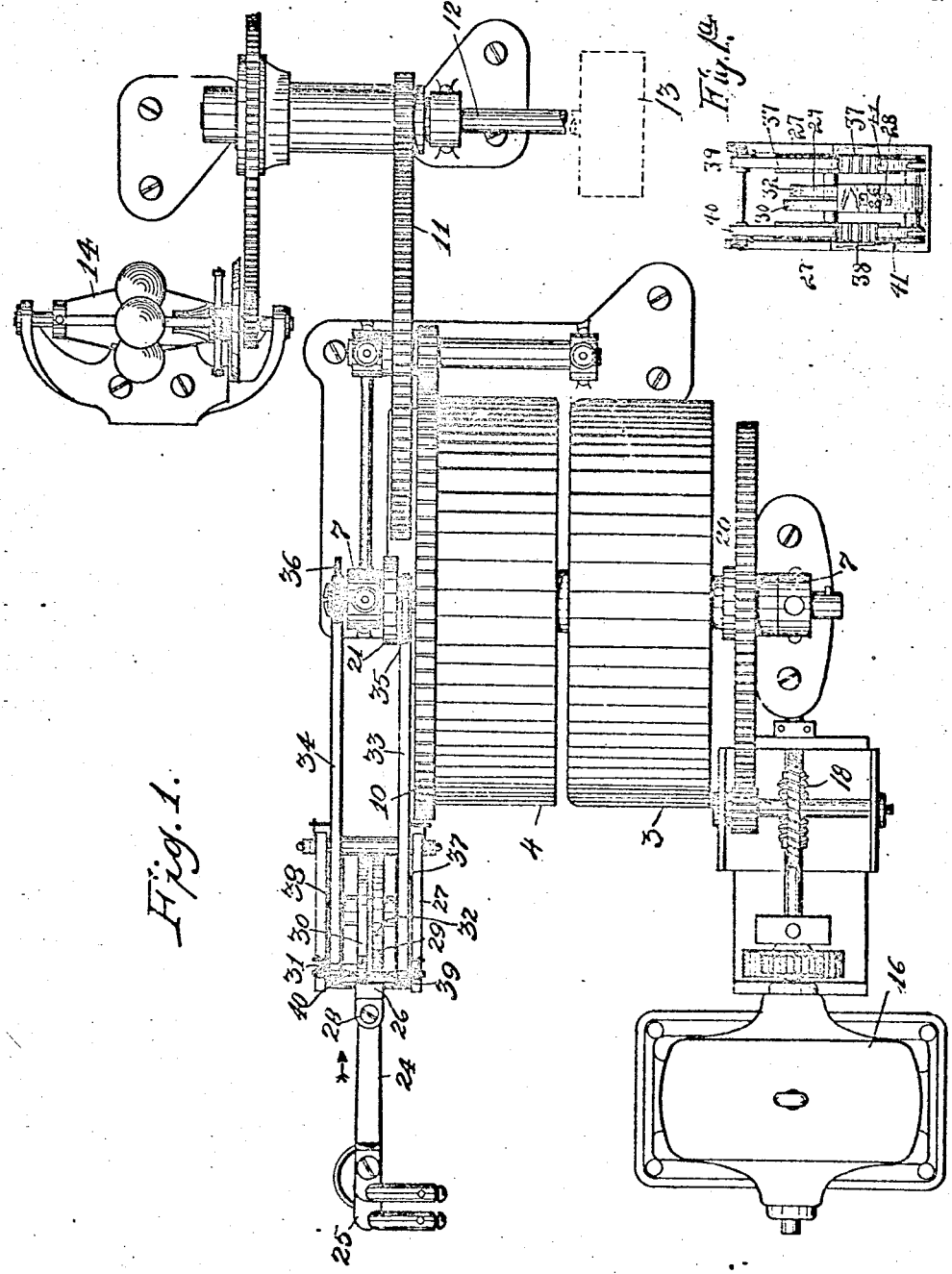
Figure 2:
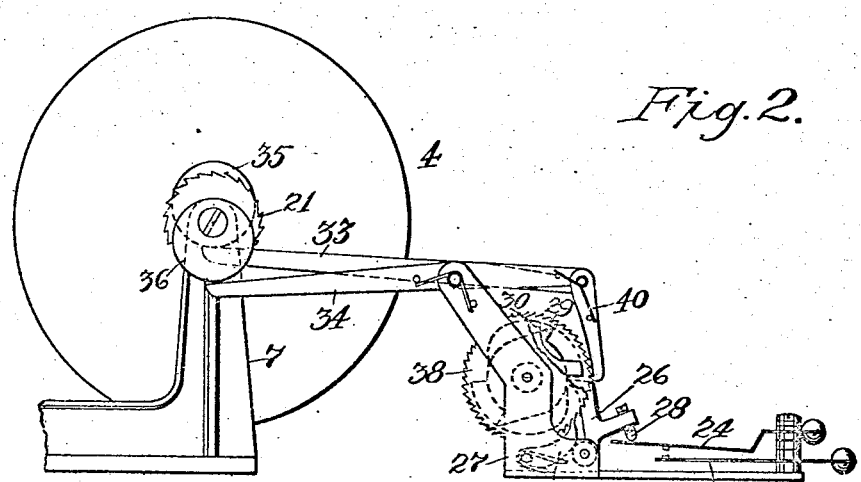
Figure 3:
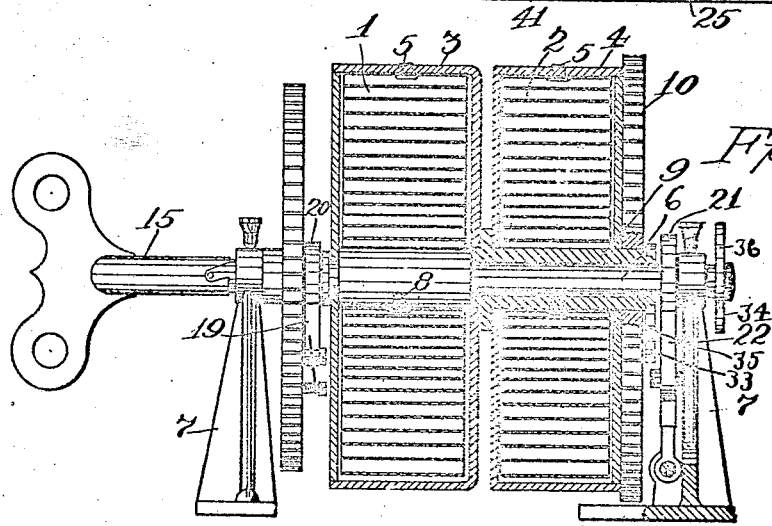

In the accompanying drawings which illustrate one form of mechanism for practicing my invention, Figure 1 is a plan view of the mechanism, Fig. 1ª is an end view of the cams and their operating means looking in the direction of the arrow, Fig. 1. Fig. 2 is a detail view of the circuit breaker and its cams. Fig. 3 is a vertical cross section through the spring drums. Figs. 4, 5, 6 and 7 are diagrammatic views showing the relative positions of the operating cams for actuating the circuit breaker. Fig. 8, is a diagram of the connections with the battery, circuit breaker and motor.

Referring more particularly to the drawings, the primary motor is represented by two coil springs 1 and 2 which are connected with their respective casings 3 and 4 by screws 5 in the usual manner. The springs are mounted on a shaft 6 which is journaled in suitable standards 7, and one of them, as 1, is connected directly with one portion of the shaft, which is preferably enlarged, by any suitable means, as the ordinary screw or shoulder 8, and the other one is similarly connected with a sleeve 9 which fits upon another portion of the shaft. The sleeve is rigidly connected with the casing 3 so as to be rotated thereby and the casing 4 is loosely mounted thereon so as to be rotated by the spring 2.

A gear wheel 10 is secured to the outer end of the casing 4, which transmits power through suitable gearing 11 to a shaft 12 that is connected with the mechanism to be driven, as indicated in dotted lines 13 in Fig. 1. A governor 14 is provided for controlling the motor and causing the shaft 12 to run at a uniform rate of speed.

The springs are wound by a key 15 to any desired tension after which they are rewound intermittently by means of an electric motor 16. Current is supplied to the motor from a battery 17 and power is transmitted from the motor 16 to shaft 6 through suitable gearing 18, the last wheel of which is loosely mounted upon the shaft 6 and provided with a pawl 19 which engages with a ratchet 20 on said shaft. This permits of the shaft 6 being rotated by hand to wind up the springs independently of the electric motor. A ratchet 21 on the shaft 6 engages with a detent 22 and holds the shaft against reverse rotation after the springs have been wound by either hand or power.

The circuit 23 from the battery to the motor 16 is provided with two terminals 24 and 25 which are controlled by a two armed lever 26 that is mounted in a stand or support 27. One arm of the lever 26 is provided with an adjustable pin 28 and the other arm is adapted to be engaged by the peripheries of two cams 29 and 30. The periphery of one of the cams 30 is recessed to form a plurality of shoulders 31, two being shown in the drawings, and the other 29 is in the form of teeth 32, two being shown, the tips of the teeth being preferably even with the cam surfaces on the other cam 30.

The cams are actuated by two levers 33 and 34 which are pivotally mounted in the stand 27 and rocked by two eccentrics 35 and 36 and engage respectively with two ratchet wheels 37 and 38 by spring pressed pawls or hooks 39 and 40. Each of the ratchets is connected with one of the cams, and one of the eccentrics, as 36, is rigidly secured to the shaft 6, and the other one 5 is secured to the side of gear wheel 10. Detents 41 are provided for holding the ratchets against reverse motion, only one of which, however, is shown.

In operating my invention it is connected with the mechanism to be actuated and the springs are wound to the desired tension by the key. The electrical connections are then made and the cams 29 and 30 arranged so as to have one of the teeth 32 register with one of the shoulders 31 as shown in Fig. 4, with the circuit open. As the springs unwind the gear wheel 10 is slowly revolved with the casing 4 which causes its eccentric 35 to actuate the lever 33 and thereby rotate the cam 29 through the pawl 39 and ratchet 37. When the springs have unwound to the desired extent the cam 29 will have been slowly rotated until one of its teeth 32 will engage with one of the arms of the lever 26 and force it out until the pin 28 in the other arm closes the circuit through the terminals 24 and 25 shown in Fig. 5. This will cause the motor 16 to start up and thereby rotate the shaft 6 so as to rewind the springs. But as soon as the shaft 6 begins to rotate, the eccentric 36 actuates the lever 34 and causes its pawl 40 to begin to rotate the cam 30 through the ratchet 38, and, by the time the tooth 32 passes out of engagement with the arm of the lever 26 the cam 30 will have been rotated to such an extent that the recess will be out of register with said arm and the outer surface of the cam will hold the lever 26 in position for closing the circuit, as shown in Fig. 6.

When the cams have reached this point the winding mechanism virtually becomes the prime mover or motor, for it must not only rotate the shaft 6 against the tension of the spring to wind it up but it must hold it against the tendency to reverse rotation caused by the resistance of the load or mechanism that is being driven and which is transmitted through the springs. In this manner the mechanism is not stopped while the springs are being wound, and at the same time the cams are being rotated as above described, but the cam 30 is rotated so much faster than the cam 29 that they will assume the position shown in Fig. 7, in which the arm is just ready to drop off the shoulder 31, and thereby permit the terminals to separate and thus stop the winding motor. When this occurs, the springs will have been rewound the required amount and the cam 30 will stop its rotation and remain stationary until the cam 29 has been rotated by the unwinding of the springs so as to cause one of the teeth 32 to engage with the arm and rock the lever 26 and thereby close the circuit and rewind the springs as above described.

By this construction a series of springs can be so arranged that a certain portion of the maximum strength of each will be utilized and that portion restored by means of another intermittent source of power as soon as exhausted, thereby securing a long application of a power which is easily controlled and made uniform by any ordinary governor.

What I claim is:

1. In a constant speed mechanism, a spring motor, an electrical motor for rewinding the same, a circuit controller, two cams for engaging with said controller, one of which is provided with recesses and the other with teeth, ratchet mechanism for rotating said cams, means on one part of the spring motor for actuating the toothed cam while the spring is unwinding and means on another part for actuating the recessed cam while the spring is being rewound.

2. In a constant speed mechanism, a shaft provided with an eccentric, a spring and casing mounted on the shaft, an eccentric on the casing, an electrical motor, cut out mechanism, two cams for controlling the same, and two levers for actuating the cams, one of said levers being rocked by the eccentric on the shaft and the other one by the eccentric on the spring casing.

3. In a constant speed mechanism, a shaft provided with an eccentric at one end, a spring and casing on the shaft, an eccentric on the casing adjacent to the other eccentric, an electrical motor, cut out mechanism, two cams for controlling the same, a ratchet wheel connected with each cam, two levers adapted to be rocked by said eccentrics, and a hook on each lever for engaging with one of said ratchet wheels.

In testimony whereof I have affixed my signature, in presence of two witnesses, this tenth day of March 1906.

ADOLPH H. F. SCHAAR.

Witnesses:
W. S. BOYD,
F. P. MEDINA.